(12) United States Patent
Tuutijärvi

(10) Patent No.: US 7,024,193 B2
(45) Date of Patent: Apr. 4, 2006

(54) METHOD AND APPARATUS FOR PERFORMING IDENTIFICATION OF MEASUREMENT CHANNELS IN TDMA E-OTD

(76) Inventor: Mika Tuutijärvi, Radiomastontie 7 B 16, 90230, Oulu (FI)

(*) Notice: Subject to any disclaimer, the term of this patent is extended or adjusted under 35 U.S.C. 154(b) by 641 days.

(21) Appl. No.: 09/995,096

(22) Filed: Nov. 27, 2001

(65) Prior Publication Data

US 2002/0102994 A1  Aug. 1, 2002

Related U.S. Application Data

(60) Provisional application No. 60/264,980, filed on Jan. 30, 2001.

(51) Int. Cl.
*H04Q 7/20* (2006.01)

(52) U.S. Cl. ............... 455/434; 455/456.6; 455/524

(58) Field of Classification Search ............ 455/434, 455/437, 515, 524, 435.1, 456, 456.1, 456.6; 370/337, 347, 321
See application file for complete search history.

(56) References Cited

U.S. PATENT DOCUMENTS

| | | | | |
|---|---|---|---|---|
| 5,008,953 A | * | 4/1991 | Dahlin et al. ............... | 455/423 |
| 5,285,447 A | * | 2/1994 | Hulsebosch ................. | 370/332 |
| 5,404,355 A | * | 4/1995 | Raith .......................... | 370/311 |
| 5,613,205 A | * | 3/1997 | Dufour ........................ | 455/440 |
| 5,854,981 A | * | 12/1998 | Wallstedt et al. ........... | 455/439 |
| 5,867,786 A | * | 2/1999 | Ishi ............................. | 455/436 |
| 5,915,221 A | * | 6/1999 | Sawyer et al. .............. | 455/437 |
| 6,028,854 A | * | 2/2000 | Raith et al. ................. | 370/347 |
| 6,044,272 A | * | 3/2000 | Kobylinski et al. ......... | 455/437 |
| 6,694,138 B1 | * | 2/2004 | Kobylinski et al. ......... | 455/437 |
| 2002/0016172 A1 | * | 2/2002 | Kangras et al. ............. | 455/456 |

OTHER PUBLICATIONS

Using Phase Relationship for Position Location in Cellular Systems, Aug. 1, 1991, IBM Techinical Disclosure Bulletin (TDB-Acc-No. NN9108386), vol. 34, pp. 386-387.*

3GPP TS 04.31 v7.7.0. (Sep. 2001) 3rd Generation Partnership Project; Technical Specification Group GSM EDGE Radio Access Network; Location Services (LCS); Mobile Station (MS)-Serving Mobile Location Centre (SMLC) Radio Resources LCS Protocol (RRLP); Release 1998, pp. 80-90, no month listed.

3GPP TS 03.71 v7.7.0 (Oct. 2001) 3rd Generation Partnership Project; Technical Specification Group Services and System Aspects; Digital Cellular Telecommunications System (Phase 2+); Location Services (LCS); (Functional description)—Stage 2; Release 1998, no month listed.

* cited by examiner

*Primary Examiner*—Rafael Perez-Gutierrez
(74) *Attorney, Agent, or Firm*—Harrington & Smith, LLP

(57) ABSTRACT

A method for making Enhanced Observed Time Difference (E-OTD) measurements with a mobile station in a TDMA (ANSI-136) wireless network. The method includes steps of (a) synchronizing to a neighbor base station and receiving a Digital Traffic Channel (DTC) time slot that is on the same frequency with a desired Digital Control Channel (DCCH) that is to be measured; (b) detecting and decoding a Coded Digital Voice Color Code (CDVCC) in the DTC to obtain a DVCC; (c) verifying that the received signal is a correct signal for receiving a DCCH by comparing the received DVCC with a DVCC that forms a part of a base station neighbor list; and (d) measuring the E-OTD and associating the DVCC, the channel number and hyperband information with the E-OTD measurement resulting in an E-OTD measurement report that is transmitted to a Serving Mobile Location Center (SLMC).

9 Claims, 3 Drawing Sheets

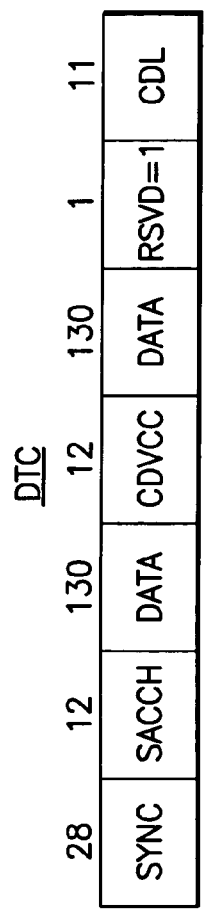
FIG.2
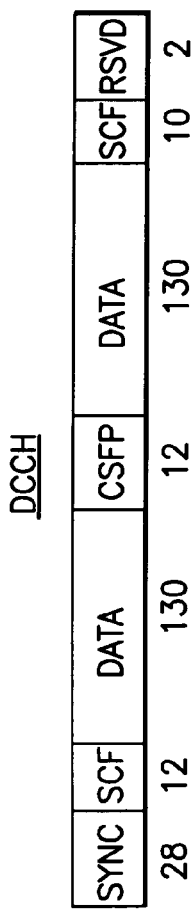
FIG.3
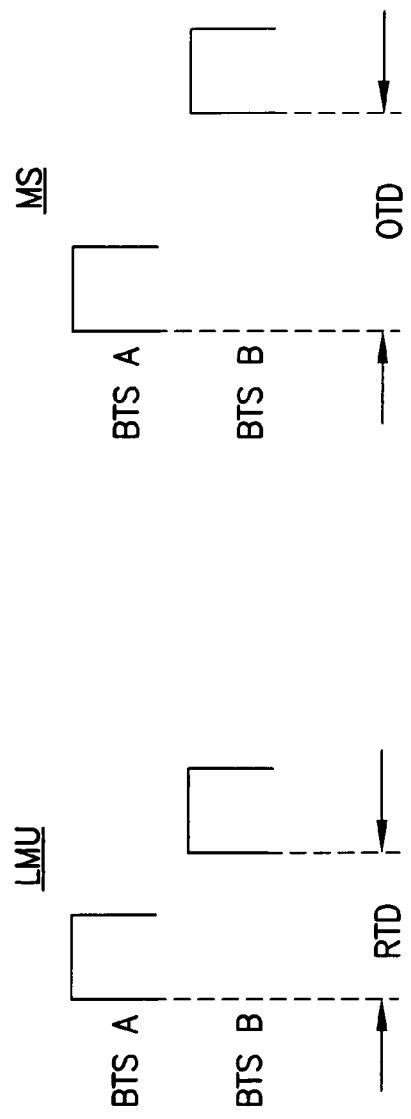
FIG.4A
FIG.4B

METHOD AND APPARATUS FOR PERFORMING IDENTIFICATION OF MEASUREMENT CHANNELS IN TDMA E-OTD

CROSS-REFERENCE TO RELATED APPLICATIONS

The present application claims the benefit of U.S. provisional patent application No. 60/264,980, filed on Jan. 30, 2001.

FIELD OF THE INVENTION

This invention relates generally to wireless communication systems and methods and, in particular, relates to techniques for signaling neighbor channel measurement information from a wireless network to a mobile station.

BACKGROUND OF THE INVENTION

It will be useful to provide an Enhanced Observed Time Difference (E-OTD) functionality in the U.S. Time Division Multiple Access (TDMA) wireless standard known as ANSI-136. The E-OTD would be used by the mobile station and the wireless network when making measurements of neighboring cell base stations, and is thus important for determining the location of the mobile station.

In practice, the E-OTD method for mobile station neighbor base station measurements is based on mobile station-made measurements of observed time differences between a reference base station and at least two neighbor base stations. A wireless network element known as a Location Measurement Unit (LMU) is associated with all or substantially all base transceiver stations, also referred to as base stations. The LMU measures the real time difference (RTD) between the transmission timing of neighbor base stations and the reference base station. When the OTD and the RTD are known the Geometric Time Difference (GTD) can be calculated as: GTD=OTD-RTD.

While the use of the E-OTD has been standardized in Global System for Mobile Communications (GSM) wireless networks, at present there is no standard available to provide E-OTD functionality for ANSI-136 networks. A simple incorporation of the E-OTD GSM functionality into ANSI-136 is not practical, as a number of differences exist between the air interfaces of GSM and ANSI-136. For example, ANSI-136 does not support the Base Station Identity Code (BSIC) that is supported by GSM. Other significant differences exist as well.

As a further example, in the ANSI-136 network the mobile station (e.g., a cellular telephone or personal communicator) receives from an Extended Broadcast Control Channel (E-BCCH) a neighbor list of base stations. The neighbor list includes a frequency channel number and a Digital Voice Color Code (DVCC) for a frequency channel that the mobile station is expected to measure. The DVCC is used to identify the base station that transmits the frequency channel, and each frequency channel transmitted by a given base station will typically include a different DVCC, and the same frequency transmitted by two different base stations will ideally also have different DVCCs. A problem arises in that the mobile station must ensure that the channel that it is measuring is the correct channel, and not a channel being received from a base station in some other cell. This could be done by relying on a proper network design, or by receiving the Fast Broadcast Control Channel (F-BCCH) on the neighbor cell Digital Control Channel (DCCH) and decoding the DVCC field that is a part of the F-BCCH. The mobile station could then verify that the decoded DVCC is the same as was broadcast in the neighbor cell message on the serving cell's DCCH. Unfortunately, the reception of the neighbor cell F-BCCH requires a period of time that is greater than one second, which would result in unacceptable delays for the E-OTD measurement process. As such, a need exists to quickly and reliably identify a channel to be measured.

A further problem arises in regard to the actual measurement report from the mobile station to the Serving Mobile Location Center (SMLC) of the wireless network, as the mobile station must identify the channel that it has measured. Simply providing a channel number is not sufficient as additional information, such as channel number and the channel's DVCC, would provide better information. Even further information, such as the channel number, DVCC and the hyperband information, would be preferred.

As a point of reference, in the GSM system the following alternative procedures can be used by the mobile station for identifying a neighbor cell that is measured:

1. the cell identity is conveyed by using C1, and the Location Area Code (LAC) is the same as the current serving base station;
2. the cell identity is conveyed using the 51 Multiframe offset and the BCCH carrier;
3. the cell identity is conveyed using an index that refers to the Base Transceiver Station (BTS) listed in the Measure Position Request component (the indicated reference BTS is 1); or
4. the cell identity is conveyed using an index that refers to the BTS listed in the BCCH allocation list (System Information Neighbor Lists) of the serving BTS.

The first three techniques are not applicable to the ANSI-136 system. The fourth technique might be applicable, but it is network implementation specific, and thus may not be applicable universally across all ANSI-136 networks. This would cause a problem when the mobile station roams between networks.

OBJECTS AND ADVANTAGES OF THE INVENTION

It is a first object and advantage of this invention to provide an improved technique for making neighbor base station measurements.

It is another object and advantage of this invention to provide a technique to reliably and quickly make E-OTD measurements in a non-GSM TDMA wireless network.

It is a further object and advantage of this invention to provide a technique to reliably and quickly make E-OTD measurements in an ANSI-136 TDMA wireless network.

SUMMARY OF THE INVENTION

The foregoing and other problems are overcome and the foregoing objects and advantages are realized by methods and apparatus in accordance with embodiments of this invention.

A method is disclosed for making Enhanced Observed Time Difference (E-OTD) measurements with a mobile station. The method includes steps of (a) synchronizing to a neighbor base station and receiving a Digital Traffic Channel (DTC) time slot that is on the same frequency with a desired Digital Control Channel (DCCH) that is to be measured; (b) detecting and decoding a Coded Digital Voice Color Code (CDVCC) in the DTC to obtain a DVCC; (c) verifying that the received signal is a correct signal for receiving a DCCH by comparing the received DVCC with a DVCC that forms a part of a base station neighbor list; and (d) measuring the E-OTD and associating the DVCC, the channel number and hyperband information with the E-OTD measurement resulting in an E-OTD measurement report that is transmitted to a Serving Mobile Location Center (SLMC).

In another aspect this invention provides a method for making measurements of neighbor base stations with a mobile station. This method includes steps of (a) receiving a measurement list of neighbor base stations, the list including information for identifying at least one neighbor base station that transmits a frequency channel to be measured; (b) tuning to a frequency channel transmitted by the neighbor base station, the frequency channel containing a control channel used for making a measurement; (c) verifying that the frequency channel is a frequency channel transmitted by the base station to be measured by receiving a traffic channel that is on the same frequency channel and extracting from the received traffic channel certain information that can be used to identify the base station that transmits the traffic channel; (d) comparing the extracted information with the information for identifying the neighbor base station that was received in the measurement list to ensure that the correct frequency channel is being received; and (e) associating the extracted information with the result of the measurement.

In the preferred embodiment of this invention the measurement is an E-OTD measurement, the information comprises a DVCC, and the step of extracting includes a step of decoding a CDVCC field that forms a part of a received DTC that is in the same RF channel with a DCCH used for the measurement.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 depicts the forward link Digital Traffic Channel (DTC) slot structure as defined in TIA/EIA-136-131-A;

FIG. 3 shows the forward link DCCH slot structure as defined in TIA/EIA136-121-A;

FIGS. 4A and 4B are useful in understanding the operation of the LMUs in measuring a Real Time Difference (RTD) between two base stations, as well as the operation of the mobile station in measuring an Observed Time Difference (OTD) between the same two base stations.

DETAILED DESCRIPTION OF THE INVENTION

Figure 1:
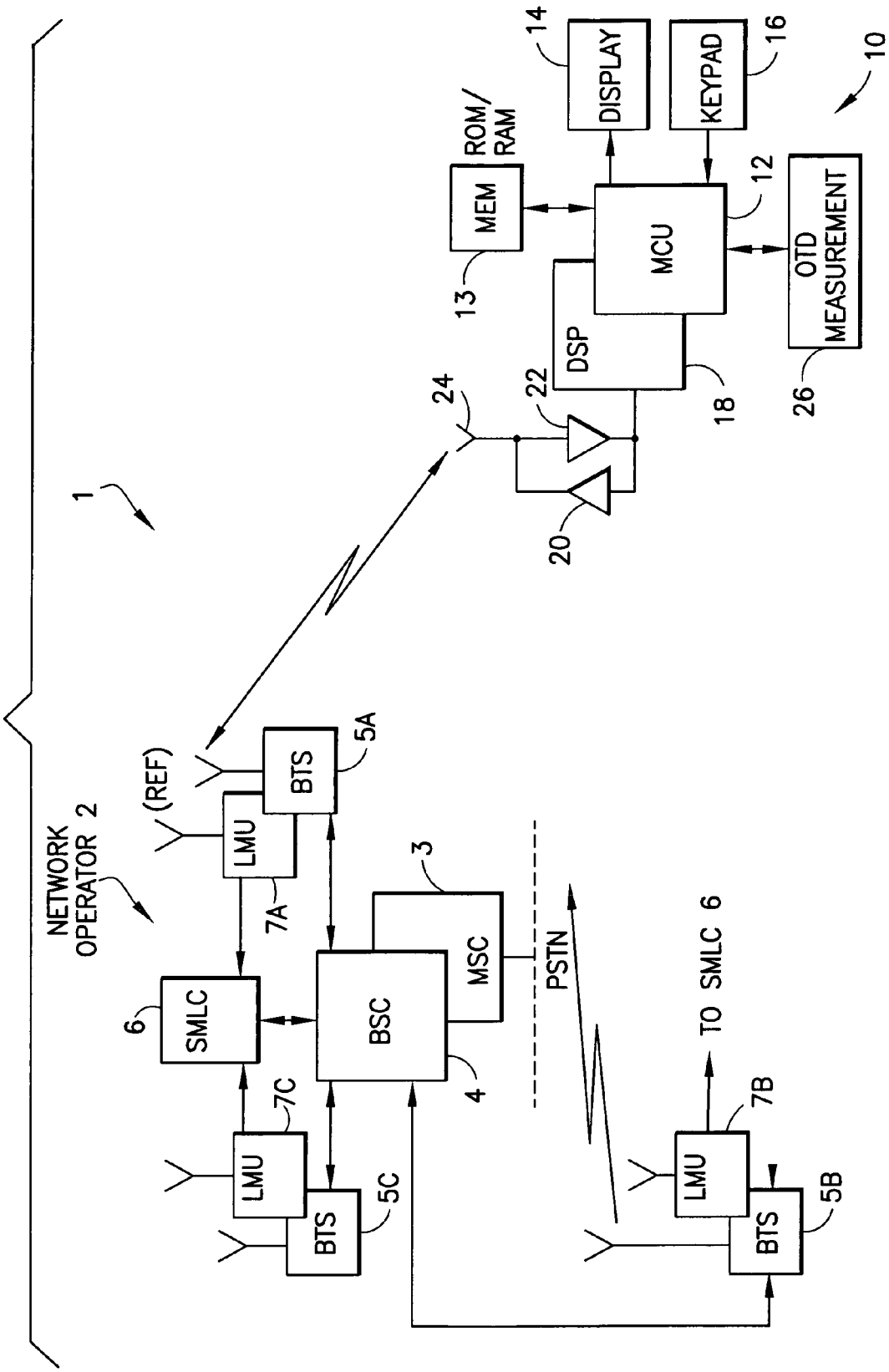
FIG. 1 is a simplified block diagram depicting a wireless communications system that is suitable for practicing this invention.

Referring to FIG. 1, there is illustrated a simplified block diagram of an embodiment of an exemplary wireless telecommunications system 1 that includes a mobile station 10. FIG. 1 also shows an exemplary network operator 2 having, for example, a mobile switching center (MSC) 3 for connecting to a telecommunications network, such as the Public Switched Telephone Network or PSTN, at least one base station controller (BSC) 4, and a plurality of base transceiver stations (BTS) 5A, 5B, 5C, collectively referred to as the BTS 5, that transmit in a forward or downlink direction both physical and logical channels to the mobile station 10 in accordance with a predetermined air interface standard. It is assumed that a reverse or uplink communication path exists from the mobile station 10 to the network operator, which conveys mobile originated access requests and traffic, including possibly packet data traffic.

One BTS 5 is assumed to be the currently serving BTS 5A, or reference (REF) BTS, and at least one or two others are assumed to be neighbor BTSs 5B, 5C that are included in a neighbor channel list received by the MS 10, and which the MS is to measure using the E-OTD process in accordance with the teachings of this invention.

In the presently preferred, but not limiting, embodiment of these teachings, the air interface standard conforms to a Time Division Multiple Access (TDMA) air interface, such as one known as ANSI-136.

The network operator 2 is assumed to include a Serving Mobile Location Center (SMLC) 6 that is to receive the Real Time Difference (RTD) measurement data from a plurality of Location Measurement Units (LMU) 7, individual ones of which are associated with individual ones of the BTSs 5. Each LMU 7 includes a receiver for receiving signals from the other base stations 5 whose transmissions are not synchronized to one another. Referring also to FIG. 4A, the LMU 7 measures the time differences between a pair (BTS A, BTS B) of received base station 5 transmissions and, since the locations of the BTSs 5 can be known with great precision, the LMU 7 can calculate the RTDs between the signals received from the different BTSs. The LMUs 7 transmit the calculated RTDs to the SMLC 6, which calculates the Geometric Time Difference (GTD) as: GTD=OTD-RTD.

The mobile station 10 measures the OTD between base stations A and B using an OTD measurement unit 26 (see FIG. 4B) for the different BTSs 5, but it cannot determine the RTD, as it does not have knowledge of the locations of the BTSs 5, or of its own location. The mobile station 10 thus transmits the measured OTD values to the SMLC 6 via the serving BTS 5, which uses the OTD in accordance with the foregoing expression to calculate the GTD. For the case of one pair of BTSs 5, the result is a geometric (hyperbolic) curve on which the mobile station 10 lies. By calculating these curves for at least two pairs of BTSs 5, the intersection point of the curves gives the actual location of the mobile station 10. Note in FIG. 4B that the OTD happens to be greater than the RTD because of different propagation delays.

The mobile station 10 typically further includes a microcontrol unit (MCU) 12 having an output coupled to an input of a display 14 and an input coupled to an output of a keyboard or keypad 16. The mobile station 10 may be considered to be a handheld radiotelephone, such as a cellular telephone or a personal communicator, and may have a microphone and a speaker (not shown) for conducting voice communications. The mobile station 10 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred E-OTD measurement and reporting process.

The mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 1. The mobile station 10 uses the receiver 22 to receive transmissions from the reference BTS 5, as well as from the neighbor BTSs 5, for E-OTD measurement purposes, and uses the transmitter 20 to report the measurement results from the OTD measurement unit 26 to the SLMC 6.

In the presently preferred embodiment of this invention, embodied as the TDMA E-OTD wireless system, the MCU 12 and DSP 18 cooperate with the OTD measurement unit 26, which could be implemented with software routines, to measure OTDs, and the SMLC 6 receives the OTD reports from the OTD measurement unit 26. Preferably, the mobile station 10 measures the OTD between the serving BTS 5A DCCH and at least two neighbor Base Station 5B and 5C DCCHs and reports the values to the SMLC 6. The SMLC 6 then calculates the mobile station 10 geographical coordinates (GTD) using the RTD values received from the LMUs 7 and the OTD values received from the mobile station 10, by known methods (see, for example, GSM 03.71, GSM 04.31 and GSM 04.71, incorporated by reference herein), which is the desired result.

FIG. 2 shows the downlink or forward (BTS 5 to mobile station 10) Digital Traffic Channel (DTC) slot structure as defined in TIA/EIA- 136-131-A, while FIG. 3 shows the downlink DCCH slot structure as defined in TIA/EIA-136-121-A. Note that the DCCH slot does not include the CDVCC (Coded Digital Voice Color Code) element that is included in the DTC. The CDVCC is defined in Section 1.2.5 of TLA/ELA-IS-136.2 (Rev. A), where it is referred to as the Coded Digital Verification Color Code, along with the procedure for forming the DVCC information word polynomial.

However, the DVCC (the value of which identifies a base station that transmits a frequency channel (channel number) via a BTS 5) is broadcast in the F-BCCH sub-channel of the DCCH. The periodicity of the F-BCCH sub-channel is 640 milliseconds, resulting in up to one second to receive the full cycle of F-BCCH data. The one second delay per neighbor base station would thus add three seconds to the E-OTD measurement delay in the case of the three neighbor BTSs that were being measured. This amount of delay would be objectionable.

In further detail, the DVCC is used to identify a transmission and not a frequency channel per se, as the mobile station 10 is receiving a signal and is aware of the frequency channel on which the signal is received. However, the problem is that the mobile station 10 cannot know from which base station the channel was transmitted. The DVCC is therefore used to identify the transmission (not the frequency channel number, for that is known). The DVCC must be different on neighboring base stations, so that their transmissions can be distinct. The DVCC may differ between different channels of a single base station, and in theory could differ between different time slots transmitted on a single frequency channel. For example, in full rate case there are the slots on one frequency for three different subscribers. The DVCC does not, however, have to be different in different slots or different channels. Thus, and in accordance with an aspect of these teachings, with the aid of the DVCC the transmitting base station can be identified, and the mobile station 10 is assured that the correct neighbor base station's transmission on the traffic channel is being received.

That is, and in accordance with the teachings of this invention, when the mobile station 10 synchronizes to the neighbor BTS 5B it receives the DTC time slot that is on the same frequency with the DCCH. The mobile station 10 detects and decodes the CDVCC field in the DTC. The mobile station 10 then verifies that this is indeed the correct DCCH frequency by comparing the received DVCC with the DVCC that it received as part of the neighbor list of the serving BTS 5A, i.e., the neighbor list received in the DCCH of the serving BTS 5A. The mobile station 10 then adds or appends the DVCC with the associated channel frequency (channel number), as well as hyperband information, and the OTD in the E-OTD measurement report that is sent from the mobile station 10 to the SMLC 6. This technique thereby provides for the E-OTD measurement technique to be used in a non-GSM TDMA system (e.g., in the ANSI-136 system), and also avoids the lengthy time delays that would be experienced if the F-BCCH were to be used for obtaining the DVCC of the measured channel.

In the typical case the DVCC is the same on different slots, but this need not be a requirement. In this invention it is recognized either that the DVCC is the same in different slots, or that it varies in different slots. For example, assume that the default DVCC is 150, and when receiving a second slot a DVCC value of 152 is encountered. This new value can be simply reported to the network operator 2, which is assumed to have knowledge of the fact that the DVCCs 150 and 152 belong to the same base station.

With regard to the above-mentioned hyperband information, this information is retrieved by checking in which neighbor list the neighbor BTS 5B is listed on the DCCH. There are two neighbor lists: (i) Neighbor List (TDMA) and (ii) Neighbor List (Other Hyperband). The Neighbor List (TDMA) is defined to contain channel numbers in the 800 MHz band, and is meant for use by those mobile stations 10 that support only the 800 MHz band operation, and not 1900 MHz band operation (i.e., "single-band mobile stations" or "single-banders"). The Neighbor List (Other Hyperband) contains at least 1900 MHz band channels.

The hyperband information thus defines the hyperband that is being used (e.g., at present the 800 MHz band or the 1900 MHz band, and possible other bands in the future). The information concerning the hyperband is preferably included, as the channel number alone does not indicate with which frequency band the channel number is associated.

Figure 5:
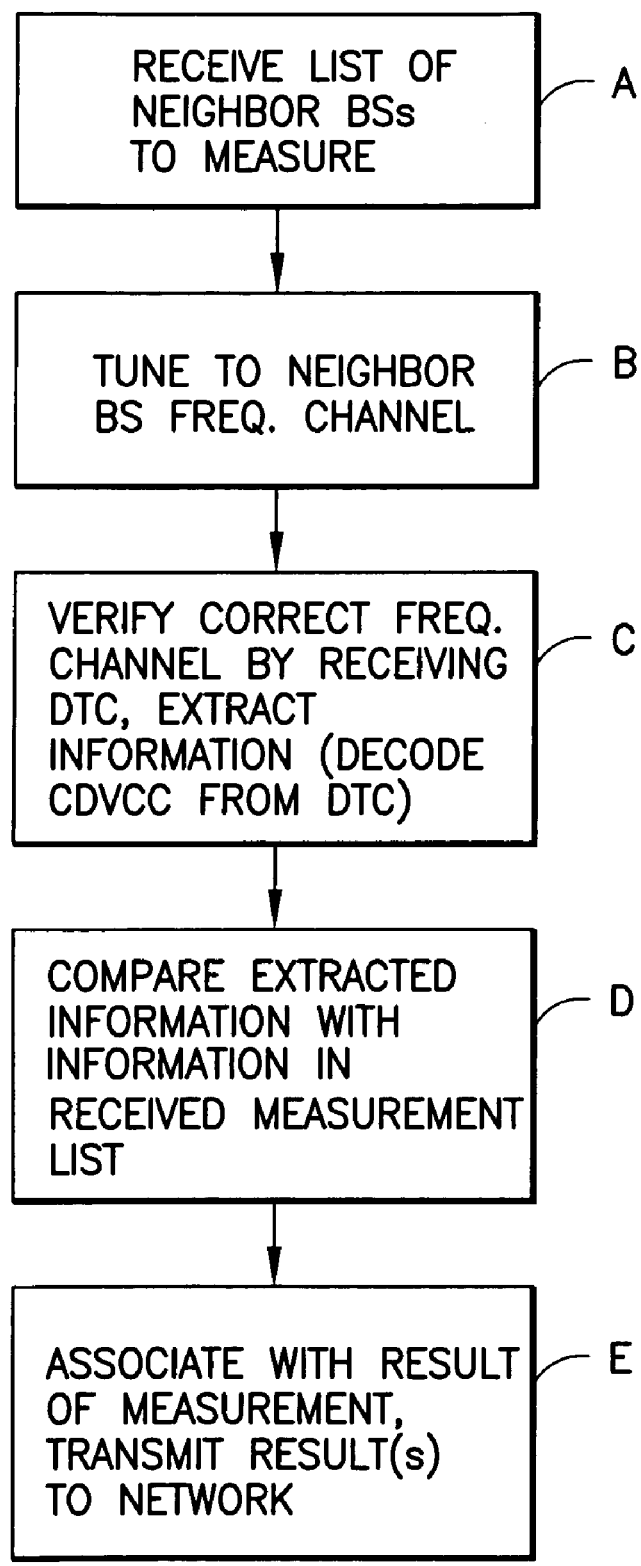
FIG. 5 is a logic flow diagram that is useful in explaining a method in accordance with this invention.

Referring now to FIG. 5, a method in accordance with the foregoing teachings will now be described. The method is for making measurements of neighbor base stations 5 with the mobile station 10, and includes at Step A receiving a measurement list of neighbor base stations 5B, 5C. The list contains information for identifying frequency channels transmitted by the neighbor base stations. At Step B the mobile station 10 tunes to a frequency channel transmitted by a neighbor base station 5B, where the frequency channel contains a control channel used for making a measurement. At Step C the mobile station 10 verifies that the frequency channel is a correct frequency channel transmitted by the neighbor base station to be measured by receiving a traffic channel that is on the same frequency channel, and by extracting from the received traffic channel certain information that can be used to identify the base station that transmits the traffic channel. At Step D the mobile station 10 compares the extracted information with the information used for identifying the neighbor base stations that transmit frequency channels received in the measurement list, and thus ensures that the correct frequency channel is being received. At Step E the mobile station 10 associates the extracted information with the result of a measurement.

In the preferred embodiment the measurement is an Enhanced Observed Time Difference (E-OTD) measurement, the information is comprised of a Digital Voice Color Code, and the Step C of extracting information includes a sub-step of decoding a Coded Digital Voice Color Code field that is a part of the DTC that is in the same RF channel as the DCCH used for the measurement.

In the preferred embodiment the Step E of associating the extracted information operates to include a channel number, a hyperband, and the DVCC with the result of the E-OTD measurement that is reported to the wireless network 2 from the mobile station 10.

While the invention has been particularly shown and described with respect to preferred embodiments thereof, it will be understood by those skilled in the art that changes in form and details may be made therein without departing from the scope and spirit of the invention.

What is claimed is:

1. A method for making measurements of neighbor base stations with a mobile station, comprising:

receiving a measurement list of neighbor base stations, the list including information for identifying at least one neighbor base station that transmits a frequency channel to be measured;

tuning to a frequency channel transmitted by the neighbor base station, the frequency channel containing a control channel to be used for making a time difference measurement;

verifying that the frequency channel is a correct frequency channel transmitted by the neighbor base station to be measured by receiving a traffic channel that is on the same frequency channel and extracting from the received traffic channel certain information that can be used to identify the base station that transmits the traffic channel;

comparing the extracted information with the information for identifying the neighbor base station that was received in the measurement list to ensure that the correct frequency channel is being received;

making the time difference measurement between the neighbor base station and a reference base station using the control channel on the frequency channel; and associating the extracted information with the result of the measurement.

2. A method as in claim 1, wherein the measurement is an Enhanced Observed Time Difference (E-OTD) measurement, wherein the information is comprised of a Digital Voice Color Code (DVCC), and where extracting includes decoding a Coded Digital Voice Color Code (CDVCC) field that comprises a part of a Digital Traffic Channel (DTC) that is in the same RF channel with a Digital Control Channel (DCCH) used for the E-OTD measurement, and wherein associating includes a channel number, a hyperband, and the DVCC with the result of the E-OTD measurement that is reported to a wireless network from the mobile station.

3. A method as in claim 1, wherein the information is comprised of a Digital Voice Color Code (DVCC), and where extracting includes decoding a Coded Digital Voice Color Code (CDVCC) field that comprises a part of a Digital Traffic Channel (DTC) that is in the same RF channel with a Digital Control Channel (DCCH) used for the measurement.

4. A method as in claim 1, wherein the measurement is an Enhanced Observed Time Difference (E-OTD) measurement.

5. A mobile station comprising an RF transceiver having an RF transmitter and an RF receiver, said mobile station further comprising a controller coupled to the RF transceiver and being programmed for making measurement of neighbor base stations, said controller being programmed to (a) receive a measurement list of neighbor base stations from a serving base station, the list containing information for identifying at least one neighbor base station that transmits a frequency channel; (b) to tune said RF receiver to a frequency channel transmitted by the neighbor base station, the frequency channel containing a control channel to be used for making a time difference measurement; (c) to verify that the frequency channel is a correct frequency channel transmitted by the neighbor base station to be measured by receiving a traffic channel that is on the same frequency channel and by extracting from the received traffic channel certain information that can be used to identify the base station that transmits the traffic channel; (d) to compare the extracted information with the information for identifying the at least one neighbor base station that was received in the measurement list to ensure that the correct frequency channel is being received; (e) to make the time difference measurement between the neighbor base station and a reference base station using the control channel on the frequency channel; and (f) to associate the extracted information with the result of the measurement.

6. A mobile station as in claim 5, wherein the measurement is an Enhanced Observed Time Difference (E-OTD) measurement, wherein the information is comprised of a Digital Voice Color Code (DVCC), and where said controller, when extracting said certain information, decodes a Coded Digital Voice Color Code (CDVCC) field that comprises a part of a Digital Traffic Channel (DTC) that is in the same RF channel with a Digital Control Channel (DCCH) used for the E-OTD measurement, and where said controller, when associating the extracted information with the result of a measurement, includes a channel number, a hyperband and the DVCC with the result of the E-OTD, and reports the result of the measurement by transmitting the result through said RE transmitter.

7. A mobile station as in claim 5, wherein the information is comprised of a Digital Voice Color Code (DVCC), and where said controller, when extracting said certain information, decodes a Coded Digital Voice Color Code (CDVCC) field that comprises a part of a Digital Traffic Channel (DTC) that is in the same RF channel with a Digital Control Channel (DCCH) used for the measurement.

8. A mobile station as in claim 5, wherein the measurement is an Enhanced Observed Time Difference (E-OTD) measurement.

9. A method for making Enhanced Observed Time Difference (E-OTD) measurements with a mobile station, comprising:

receiving from a neighbor base station a signal on a Digital Traffic Channel (DTC) time slot that is on the same frequency with a desired Digital Control Channel (DCCH) that is to be used for measuring the E-OTD;

detecting and decoding a Coded Digital Voice Color Code (CDVCC) in the DTC to obtain a DVCC;

verifying that the received signal is a correct signal for receiving the desired DCCH by comparing the received DVCC with a DVCC that forms a part of a base station neighbor list; and measuring the E-OTD using the desired DCCH and associating the DVCC and channel number and hyperband information with the E-OTD measurement to obtain an E-OTD measurement report that is transmitted to a Serving Mobile Location Center (SLMC).

* * * * *

UNITED STATES PATENT AND TRADEMARK OFFICE
CERTIFICATE OF CORRECTION

| | |
|---|---|
| PATENT NO. | : 7,024,193 B2 |
| APPLICATION NO. | : 09/995096 |
| DATED | : April 4, 2006 |
| INVENTOR(S) | : Tuutijarvi, Mika |

Page 1 of 1

It is certified that error appears in the above-identified patent and that said Letters Patent is hereby corrected as shown below:

<u>Column 8,</u>
Line 50, delete "RE" and replace with -- RF --.

Signed and Sealed this

Twentieth Day of June, 2006

JON W. DUDAS
*Director of the United States Patent and Trademark Office*